United States Patent [19]

Wakeem

[11] 4,241,495

[45] Dec. 30, 1980

[54] METHOD AND APPARATUS FOR DISASSEMBLING WOODEN PALLETS

[76] Inventor: Dale Wakeem, Rte. 4, Box 73, Lamar, Mo. 64759

[21] Appl. No.: 4,753

[22] Filed: Jan. 19, 1979

[51] Int. Cl.³ .............................................. B23P 19/00
[52] U.S. Cl. ........................................ 29/700; 29/252; 83/925 R; 51/5 R
[58] Field of Search ................. 29/427, 252, 772, 822, 29/700, 403, 239, 253; 83/925 R; 51/5 R

[56] References Cited

U.S. PATENT DOCUMENTS

| | | | |
|---|---|---|---|
| 2,593,843 | 4/1952 | Cannon | 29/33 R |
| 3,916,498 | 11/1974 | Lopez et al. | 29/252 X |
| 3,991,459 | 11/1976 | Rapp | 29/252 |
| 4,051,588 | 10/1977 | Conkel | 29/252 |
| 4,089,098 | 5/1978 | DeMarco | 29/252 X |
| 4,112,578 | 9/1978 | Sanford | 29/252 X |

*Primary Examiner*—Milton S. Mehr
*Attorney, Agent, or Firm*—Lowe, Kokjer, Kircher, Wharton & Bowman

[57] ABSTRACT

A method and apparatus for disassembling wooden pallets is disclosed. The pallet disassembling apparatus includes a working table for supporting a pallet in an upright position for disassembly. The slats are detached from the ribs of the pallet to which they are nailed or similarly fastened by means of a plurality of cutting assemblies which are positioned such that one cutting assembly corresponds with each rib of the pallet. The cutting assemblies are carried by a cross head which is driven in a vertical path to bring each cutting assembly into engagement with each slat fastened to its corresponding rib. Each cutting assembly includes a pair of opposing plates having sharp edges for partly separating a slat from its corresponding edge of the rib to thereby create between them a gap wherein a portion of the nail or fastening member used to secure this slat to its corresponding edge of the rib is exposed. The sharp edges may also be employed to shear the nails or each cutting assembly also may include a motor driven circular saw blade positioned adjacent to each plate of the cutting assembly. The opposing plates, and if included, saw blades, of the cutting assemblies are coupled with each other so that they are capable of moving relative to each other to accomodate pallets of varying widths.

21 Claims, 5 Drawing Figures

METHOD AND APPARATUS FOR DISASSEMBLING WOODEN PALLETS

BACKGROUND AND BRIEF DESCRIPTION OF THE INVENTION

This invention relates in general to a method and apparatus for disassembling wooden pallets to recover the individual components thereof.

Wooden pallets are commonly used in commerce to handle and carry a wide range of goods and cargo. In particular, pallets are used in the transportation of boxes, crates or bag loads from one place to another. These wooden pallets are typically constructed of a plurality of generally parallel spaced apart ribs positioned between a plurality of parallel slats which are spaced apart from each other and fastened to the top and bottom edges of the ribs at a generally right angle therewith.

Wooden pallets are frequently damaged in use due to the heavy loads carried and to the rough handling to which they are subjected by the lift trucks used in transporting them. The damage typically consists of one or more of the slats or ribs being broken or cracked, making further use of the pallet unsafe. In the past, broken pallets were most often discarded. However, the escalating cost of lumber and the superior strength of aged wood now make it profitable and desirable to salvage the sound boards for use in the construction of new pallets.

Presently, wooden pallets are most often disassembled by hand. In performing this operation, a workman uses a crowbar to forceably pry the slats away from the rib pieces. This technique, however, is time consuming, costly and extremely inefficient since many of the sound boards are broken or cracked as a direct result of this operation.

Another problem often associated with the use of wooden pallets entails the handling of the pallets after they are used in the delivery of goods to a destination customer. Quite often, the destination customer has no further use for the pallets in his business and, as a result, simply discards the pallets as trash. This course of action, however, results in the waste of wood which could be put to good use of the pallets were disassembled.

It is therefore an object of the present invention to provide a method and apparatus for quickly and easily disassembling wooden pallets to recover the individual components of such pallets.

Another object of the present invention is to provide a method and apparatus for disassembling wooden pallets in a simple and efficient manner with minimal damage to the sound boards of the pallet.

A further object of the present invention is to provide a method and apparatus for disassembling wooden pallets wherein a pallet may be quickly and easily disassembled by a single operator to reduce the cost of the operation.

It is an additional object of the present invention to provide a method and apparatus for quickly and easily disassembling wooden pallets of varying widths.

It is yet another object of the present invention to provide a method and apparatus for disassembling wooden pallets such that the nails used to fasten the slats to the internal ribs of the pallet do not protrude outward from the separated slats thereby making handling of the separated slats safer.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views.

Figure 1:
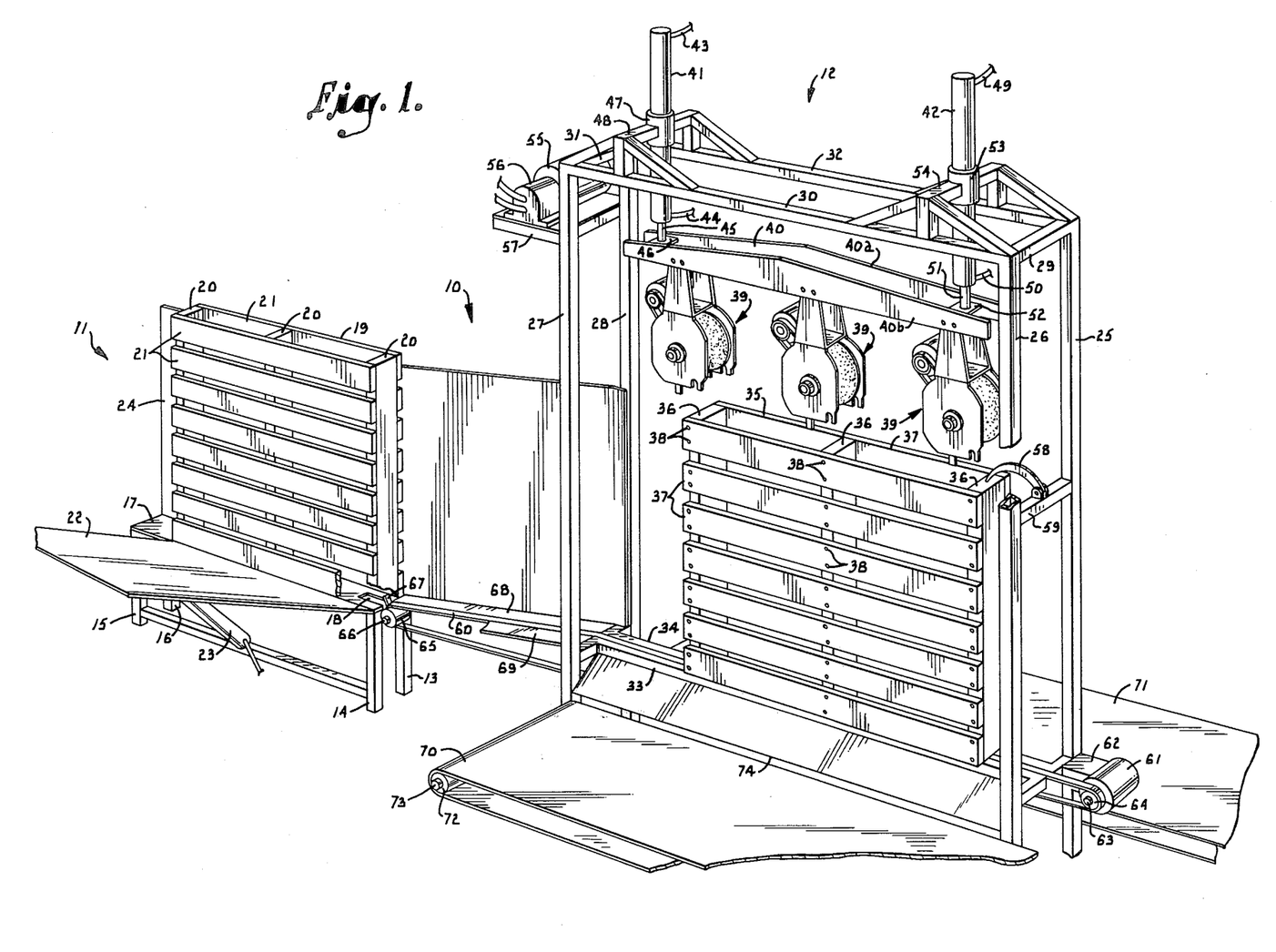
FIG. 1 is a perspective view of pallet disassembling apparatus which is constructed according to the preferred embodiment of the present invention, parts being broken away for purposes of illustration.

Referring now to FIG. 1, numeral 10 generally designates a pallet disassembling apparatus which is constructed in accordance with the preferred embodiment of the present invention. The disassembling apparatus of the present invention includes a loading station 11 where the pallets to be disassembled are received and a disassembling station 12 where the components of the received pallets are separated.

The loading station is comprised of a frame having four legs 13, 14, 15 and 16 which rest on the floor or another support surface. The frame also has a horizontal receiving table 17 secured to it. This table presents a flat surface for receiving and holding the next pallet to be disassembled. Table 17 has a rectangular shaped notch 18 cut out of the front edge thereof.

A pallet 19 is shown in FIG. 1 in position on table 17. Pallet 19 is representative of the type of pallets which this apparatus is capable of handling. In particular, the pallet is comprised of a plurality of spaced apart ribs 20 which are arranged in a parallel configuration. A plurality of wood slats 21 are fastened to the lateral edges of each rib by means of nails or some other type of fastening means having a shank portion extending from the slat into the rib. The slats are spaced apart from each other and are fastened to the lateral edges of each rib at a generally right angle therewith.

A loading platform 22 is hingedly coupled to the frame of the loading station adjacent to table 17. A pneumatic or hydraulic cylinder 23 is appropriately coupled with the underside of the loading platform to move this platform about its hinge coupling. A side retaining wall 24 is fixed to the frame of the loading station adjacent to table 17 so that the wall extends upward therefrom at a right angle therewith.

The disassembling station 12 is comprised of a support frame having four vertical legs 25, 26, 27 and 28 which rest on the ground or other support surface. These vertical legs are coupled with each other at the top of the support frame by means of a plurality of crosspieces 29, 30, 31 and 32. A pair of lower crosspieces 33 and 34 cooperate to form a working table for supporting a pallet in the desired on-edge position at the disassembling station. Crosspiece 33 is a generally U-shaped piece which is fixedly secured to legs 26 and 27 while crosspiece 34 is a generally U-shaped piece which is fixedly secured to legs 25 and 28. These two crosspieces are spaced apart from each other to provide an open channel between them.

A second pallet 35 is shown on the working table formed by crosspieces 33 and 34. This pallet is identical in design to pallet 29 and, in particular, is constructed of a plurality of interior ribs 36 and exterior slats 37. The interior ribs 36 are spaced apart from each other in a parallel relationship. The exterior slats are in turn fastened to the lateral edges of each rib by means of nails 38 or some other type of fastening means as earlier described.

The pallet disassembling machine is equipped with a plurality of cutting assemblies 39 which are operable to detach the exterior slats from the internal ribs of a pallet properly positioned on the working table formed by crosspieces 33 and 34. Each of the cutting assemblies is of identical design and construction. The design and construction of these cutting units will be described in greater detail below.

The cutting assemblies are carried by a crosshead 40 having a pair of spaced apart parallel plates 40a and 40b. The cutting assemblies are mounted to the crosshead in spaced apart relationship with the spacing between each cutting unit being substantially equal to the distance between the pallet's internal ribs. While the number of cutting assemblies is variable, it is preferable to have a direct correspondence between the number of ribs and cutting assemblies. The crosshead may also be equipped with extra holes to accommodate more cutting assemblies or to vary the spacing between the cutting assemblies.

The crosshead 40 is in turn supported from the structural frames of the disassembling station by means of a pair of hydraulic actuators 41 and 42 which operate in unison to move the crosshead and cutting assemblies carried by it in a vertical path. Hydraulic actuator 41 is a double acting cylinder having a pair of ports 43 and 44 and a piston rod 45 which is secured to the crosshead by means of a mounting bracket 46. This cylinder is mounted to the frame of the disassembling station by means of a mounting collar 47 which is attached to the frame by means of a crosspiece 48. Hydraulic actuator 42, on the other hand, is also comprised of a double acting cylinder which is equipped with a pair of ports 49 and 50 and a piston rod 51. This piston rod is in turn secured to the crosshead by means of a bracket 52. Hydraulic actuator 42 is likewise mounted to the structural frame of the disassembling station by means of mounting collar 53 which is in turn attached to the frame by means for a crosspiece 54.

A motor 55 and pump 56 are provided to produce a source of hydraulic pressure for the operation of the actuators. The motor and pump are mounted to the structural frame for the disassembling station by means of a platform 57 which is fixedly secured to the frame. A manually operated conventional remote valve control system (not shown) is used to control the operation of the actuators.

A locking member 58 is provided to hold a pallet in place on the working table of the structural frame of the disassembling station. The locking member is hingedly coupled with a crosspiece 59 which is fixedly secured between legs 25 and 26 of the frame. The locking member is hand operated and is movable to engage one of the internal ribs of the pallet to stabilize the pallet in the upright position.

Pallets are delivered to the disassembling station from the loading station by means of a conveying belt 60. The conveying belt is driven by a motor 61 which is mounted to the structural frame of the disassembling station by means of a mounting bracket 62. The drive shaft 63 of this motor carries a pulley 64. Conveying belt 60 passes around pulley 64 and around another pulley 65 which is mounted to the front portion of the loading station's structural frame by means of a horizontal shaft 66. The conveying belt carries a plurality of spaced apart lugs such as 67. These lugs protrude outward from the belt and serve as grabbing arms which engage the front rib of a pallet at the loading station to convey this pallet to the disassembling station. A pair of side plates 68 and 69 are positioned on each side of the conveying belt to provide a track on which the pallet may ride. One end of each side plate is coupled with the loading station's structural frame while the other end of each side plate is coupled with the structural frame of the disassembling station. In this way, the side plates provide a track on which pallets may be conveyed to the disassembling station from the loading station by means of the conveying belt 60. At the disassembling station, the conveying belt rides within the open channel between crosspieces 33 and 34 to bring the pallet into position on the working table.

A pair of conveyor belts 70 and 71 are positioned on each side of the disassembling station to facilitate handling of the separated boards. Conveyor belt 70 is carried by an idler pulley 72 which is mounted to the structural frame of the disassembling station by means of a horizontal shaft 73 while conveyor belt 71 is carried by a similar pulley which is not shown in this figure. Both of these conveyor belts may be driven by a common motor which is not shown in this figure. A pair of deflecting plates such as 74 are attached to the structural frame of the disassembling station below the working table formed by crosspieces 33 and 34 to direct the separated pieces of the pallet onto conveyor belts 70 and 71 for removal of these pieces from the working area of the machine.

Reference is now made to FIGS. 2, 3, 4 and 5 for a more detailed description of the cutting assemblies. As shown principally in FIGS. 2 and 3, each cutting assembly includes a pair of circular metal saws 75 and 76 which are carried by a common drive shaft 77 and an electric motor 78 for imparting rotatable movement to this drive shaft. The cutting assembly is shown in these figures in operating relationship with one of the ribs of a pallet. The rib is shown in broken lines and is designated by the numeral 79. Two of the slats fastened to this rib are also shown in this figure in broken lines and are designated by the numerals 80 and 81.

Figure 2:
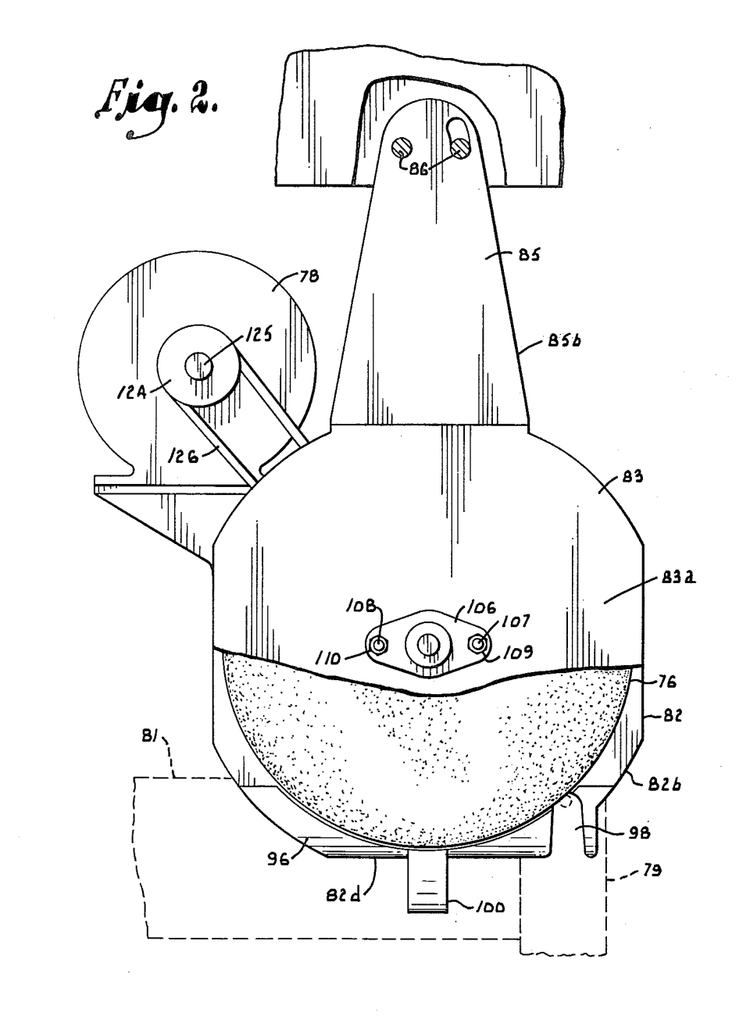
FIG. 2 is a side elevational view on an enlarged scale of an individual cutting assembly used in the pallet disassembling of FIG. 1 with portions broken away for the purposes of illustration.
Figure 3:
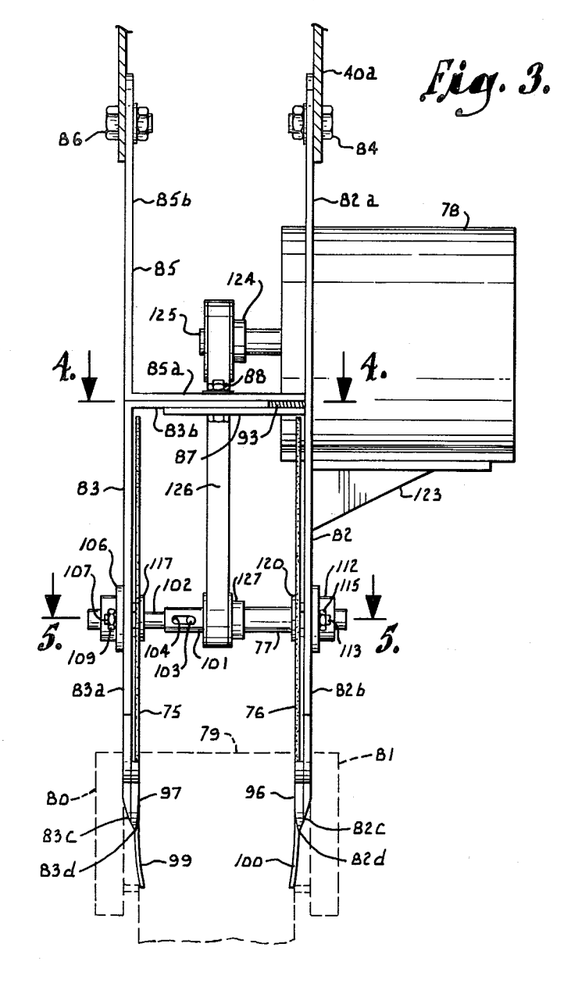
FIG. 3 is an end view of the cutting assembly shown in FIG. 2.

The drive shaft 77 is supported by and between a pair of vertically oriented support members one of which is identified as the mounting plate member 82 and the other as the cover plate member 83. Mounting plate 82 is arranged to have an upper mounting portion 82a, which is secured to the one crosshead plate 40a by means of a pair of nut and bolt assemblies 84, and an integral lower protective covering portion 82b which is sized and positioned to provide an outer protective cover adjacent saw blade 76. An L-shaped mounting bracket 85 has horizontal base leg 85a rigidly secured to the inner surface of the mounting plate. The vertical leg 85b of this bracket is secured to the other crosshead plate 40b by means of a pair of nut and bolt assemblies which are designated by the numeral 86. The bolts of fastening assemblies 84 and 86 extend through bolt holes formed plates 40a, 40b and through a bolt hole and an arcuate adjusting opening in the respective cutter carrier mounting members 82a and 85b.

Cover plate 83 is generally of inverted L-shape and is constructed to have a vertical side wall 83a and an upper horizontal leg 83b which is integrally formed with the side wall. Leg 83b lies adjacent the underside of the horizontal leg 85a of member 85 and is slidably supported on a shelf-like plate 87 which is anchored at one end to and extends in cantilever fashion from the inside surface of mounting plate 82.

Figure 4:
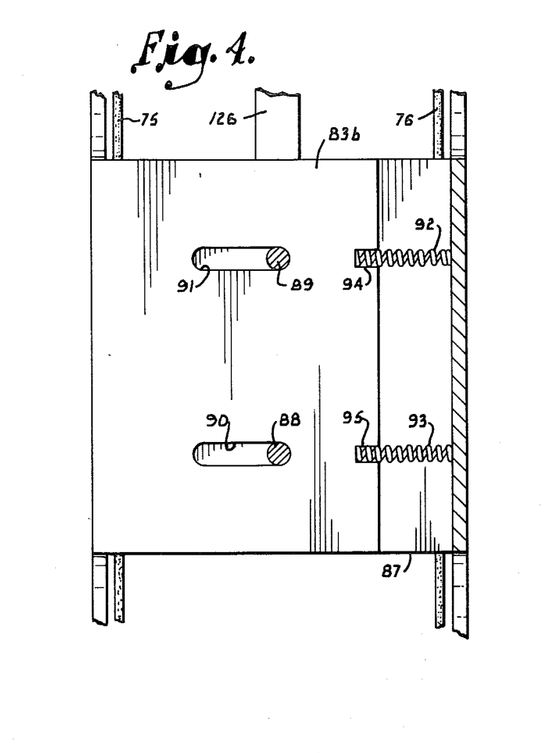
FIG. 4 is a fragmentary sectional view on an enlarged scale taken generally along line 4—4 of FIG. 3 in the direction of the arrows.

Referring now principally to FIGS. 3 and 4, cover plate 83 is coupled with mounting plate 82 by means of a pair of nut and bolt assemblies 88 and 89. Cover plate 83 is coupled with the mounting plate 82 such that the blade covering portion 83a of cover plate 83 is spaced apart from the blade covering portion 82b of the mounting plate 82. In particular, the mounting portion of covering plate 83 is slipped within the space formed by the base leg 85a of L-shaped bracket 85 and the shelf-like plate 87. Shelf-like plate 87 and the base leg 85a of L-shaped bracket 85 are each provided with a pair of circular holes (not shown in these figures) which receive nut and bolt assemblies 88 and 89. The mounting portion 83b of cover plate 83, is however, provided with a pair of elongate slots 90 and 91 for receiving nut and bolt assemblies 88 and 89, respectively. In this way, cover plate 83 is coupled with mounting plate 82 such that the side wall 83a of covering plate 83 is capable of relative movement with respect to the covering portion 82b of the mounting plate 82 to vary the spacing between them. In particular, covering plate 83 is capable of moving toward and away from mounting plate 82 with the amount of away movement being controlled by the length dimension of slots 90 and 91. A pair of compression springs 92 and 93 are provided to bias covering plate 83 at an extended position. Compression springs 92 and 93 are respectively received in recesses 94 and 95. These springs also abut against the inner surface of the mounting plate 82 to exert a force on cover plate 83 which tends to resiliently bias this plate away from the mounting plate.

The bottom edges of both the blade covering portions of the mounting and cover plates are beveled as at 82c and 83c, respectively. In addition, the bottom edges are reinforced, in each case by a reinforcing plate 96 or 97, respectively, which is secured to the inside surface of its associated blade cover plate. The reinforcing plates have beveled surfaces which extend below and form a continuation of the bevels 82c, 83c and terminate in a knife-like edge located directly below its associated saw blade. The upper edge of each reinforcing plate is curved to conform with the rim of the saw blade, being spaced slightly away from it to permit free rotation of the blade. The thickness of the reinforcing plate at the curved edge is such that it coincides with or extends slightly inwardly past inner face of the blade.

The mounting plate and its associated reinforcing plate have a positioning notch 98 located in the bottom edge thereof to fit down over the shank of a nail or other fastening device used to secure a slat to the lateral edge of the rib corresponding to this plate. A similar positioning groove (not shown) is located in the bottom edge of the cover plate 83 and its associated reinforcing plate 97. A pair of guide fingers 99 and 100 are attached to the bottom portion of covering plate 83 and mounting plate 82, respectively. These fingers extend downward from the bottom portion of these plates and have a generally inward curvature.

Figure 5:
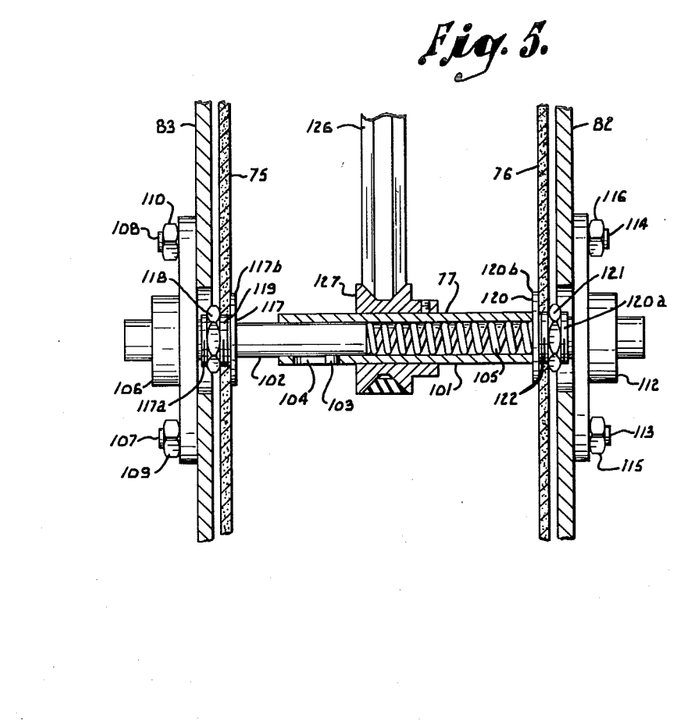
FIG. 5 is a cross sectional view on an enlarged scale taken generally along line 5—5 of FIG. 3 in the direction of the arrows.

Referring now particularly to FIGS. 2, 3 and 5, and as earlier noted each cutting assembly is also provided with a pair of circular metal cutting saw blades 75 and 76. Blade 75 is positioned adjacent to the side wall 83a of mounting plate 83 while blade 76 is positioned adjacent to the lower covering portion 82a of mounting plate 82. Each of the blades has a diameter large enough to overlap a portion of the positioning notch (such as 98) which is defined in its associated cover and reinforcing plates.

Both of the circular blades are mounted to a common shaft 77. Shaft 77 is comprised of an outer sleeve 101 and an inner core 102 which interact in a telescoping manner. In other words, the inner core 102 is capable of sliding inward or outward relative to and within tube 101. A pin 103 is secured to and extends radially outward from the outer surface of the inner core. This pin is received by a longitudinal slot 104 in the wall of tube 101 for longitudinal movement therein. This type of arrangement forces both parts of the shaft to rotate in unison while still allowing the inner core to move relative to the outer cylinder in a telescoping manner. A compression spring 105 is positioned within the tube to bias the inner core toward an extended position. One end of this compression spring rests against the circular edge of the inner core while the other end rests against the inner wall of the hollow cylinder.

The inner core 102 of the shaft assembly is carried by and journaled in a bearing 106 having a flange which is attached to the outer surface of cover plate 83 by means of a pair of threaded pins 107 and 108. These pins are fixedly secured to the outer surface of the cover plate and protrude outward there from at a right angle therewith. These pins are arranged to receive locking nuts 109 and 110 which secure the bearing to the covering plate.

The outer tube 101 of the shaft is carried by and journaled in another bearing 112 secured to the outer surface of mounting plate 82 by means of a pair of threaded pins 113 and 114 which are attached to the outer surface of this plate. These threaded pins are arranged to threadably engage locking nuts 115 and 116 to secure the bearing flanges to the mounting plate.

Blade 75 is mounted to the inner core 102 of shaft 77 by means of a mounting collar 117 which is fixably secured to the core portion of the shaft. Mounting collar 117 includes a threaded portion 117a which is arranged to receive a locking nut 118 and an enlarged retaining plate 117b which is arranged to contact the flat side surface of the blade. Blade 75 is provided with a center hole 119 which allows for the mounting collar to be inserted through it to position the blade on shaft 77. This saw is then secured to the mounting collar by means of locking nut 118 which threadably engages the threaded portion of the mounting collar.

Blade 76, on the other hand, is mounted to the outer tube 101 of shaft 77 by means of a mounting collar 120 which is fixably secured to the outer cylinder of the shaft. This mounting collar is also provided with a threaded portion 120a which is arranged to receive a locking nut 121 and an enlarged retaining plate 120b which is arranged to contact the flat side surface of the blade. The mounting collar is arranged to pass through hole 122 in the blade to position the plate on the shaft.

The blade is then secured in place on the mounting collar by means of the locking nut 121 which threadably engages the threaded portion of the mounting collar.

With reference now to FIGS. 2, 3 and 5, each cutting assembly is provided with an electric motor 78 which is arranged to impart rotational motion to shaft 77. Motor 78 is mounted to the outer surface of mounting plate 82 by means of a mounting bracket 123. This motor drives a pulley 124 which is mounted on the drive shaft 125 of this motor. A drive belt 126 is passed around pulley 124 and around a pulley 127 which is carried by shaft 77 to impart rotatable movement to this shaft.

In operation, pallet is initially placed on loading platform 22 so that the pallet is resting on one set of its slats with the internal ribs of the pallet in a generally perpendicular orientation with respect to the receiving table 17. Thereafter, hydraulic cylinder 23 is activated to move the loading platform upward about its hinged coupling. In particular, loading platform 22 is moved to a vertical position causing the loaded pallet to be placed on the receiving table 17. Pallet 19 is shown in FIG. 1 in position on the receiving table as shown in the figure, pallet 19 is resting on the table such that the internal ribs of the pallet are in a vertical position and such that the front rib intersects notch 18. Since the receiving table is only slightly wider than a pallet the side retaining wall 24 and the loading platform cooperate to properly orient the pallet on the receiving table.

After the pallet is in place on the receiving table, electric motor 61 is energized by appropriate manual switch means (not shown) to transfer this pallet to the disassembling station. Activation of motor 61 causes conveyor belt 60 to be driven in a direction such that the upper run of the belt is moving from the receiving station to the disassembling station. As the belt continues to move, one of the protruding lugs 67 passes through notch 18 and comes in contact with the inner wall of the first rib. This lug grabs the rib and pulls to the disassembling station over the track fromed by plates 68 and 69.

At the disassembling station, the conveyor belt continues to move the pallet along the working table which is formed by crosspieces 33 and 34, until the pallet appears to be properly positioned with respect to the cutting units. Once the pallet appears to be properly positioned on the working table, motor 61 is turned off and the pallet is manually adjusted to align each rib of the pallet with its corresponding cutting assembly. In particular, the pallet is moved on the working table until the nails or other pins used to fasten the slats to the internal ribs are aligned with the positioning groove in their corresponding mounting or cover plate. In this position, each cutting assembly straddles its corresponding rib such that the cover plate corresponds with one lateral edge of the rib while the mounting plate corresponds with the rib's other lateral edge.

The electric motor associated with each cutting assembly is then activated, causing rotatable movement to be imparted to its associated shaft 77 by means of its attendant pulley 124, drive belt 126 and pulley 127. This rotatable movement in turn causes the unit's circular cutting blades 75 and 76 to rotate in unison. Thereafter, hydraulic actuators 41 and 42 are made operable to drive downward crosshead 40 and the cutting units carried by it.

As a cutting unit moves downward, its positioning fingers 99 and 100 come into contact with the inner surface of the first set of slats fastened to the cutting unit's corresponding rib. These positioning fingers cooperate to adjust the spacing between cover plate 83 and mounting plate 82. If the spacing between these plates is greater than the width of the pallet, the positioning fingers force the covering plate toward the mounting plate to properly position the sharp edge of the reinforcing plate 96 secured to the mounting plate 82 at the junction between the rib's lateral edge associated with this plate and the first slat fastens to this edge of the rib and the sharp edge of reinforcing plate 97 at the junction between the rib's lateral edge associated with the plate and the first slat fastened to the edge of the rib.

Continual downward movement of the cutting unit causes the sharp edge of the reinforcing plate 96 and the sharp edge of reinforcing plate 97 to enter the joint between the rib and the first slat. The beveled nature of the mounting plate 82 and its attendant reinforcing plate 96 causes the first slat to be forced away from the edge to which it is fastened to thereby create between them a gap wherein a portion of the nails or other fastening elements used to secure this slat to this lateral edge of the rib are exposed. The covering plate 83 and its attendant reinforcing plate 97 have a similar effect upon the slats fastened to the lateral edge of the rib corresponding to these plates. As the cutting unit continues to move downward, the exposed portion of each successive nail enters the positioning notch in its corresponding plate. Further downward movement of the cutting unit causes the positioning notch to guide the cutting assembly so that each of these fastening pins is brought into contact with the cutting edge of its associated circular saw. Upon contacting the cutting edge, the nails are severed and the slat separated from this rib. The cutting assembly continues to move downward in this manner until all of the slats are removed from the rib.

It should be noted at this time that the cutting assembly is operable to simultaneously separate slats from each side of the internal rib corresponding to this unit. In addition, all of the cutting units operate in unison to simultaneously separate the slats from all of the ribs of the pallet.

While a pallet is being disassembled at the disassembling station, another pallet may be loaded into the apparatus at the loading station by placing this pallet on the loading platform as described above. The hydraulic cylinder 23 associated with this platform is then activated to position this pallet on the receiving table. The loaded pallet is then maintained in position on the receiving table until the pallet at the disassembling station has been completely disassembled.

The detached slats fall onto conveyor belt 70 or conveyor belt 71 depending upon which side of the pallet these slats are located. Conveyor belts 70 and 71 serve to convey the separated components of the pallet away from the disassembling station and to provide these components to a central receiving location. Once the last slat has been completely detached from the internal ribs of the pallet, the hydraulic actuators are reversed causing the cross head and cutting unit carried by it to be returned to their original position. Thereafter, the motor used to drive the circular saws of each cutting unit is shut off and motor 61 is activated causing the loaded pallet at the receiving station for separation of the slats from the internal ribs of the pallet.

I have also found that it is possible with some pallets to employ cutting assemblies in which the blades 75 and 76, and associated drive means, are either not activated or eliminated entirely. In this embodiment of the invention, the cutting assemblies are so located relative to the pallet that the nails are engaged during downward movement of the cutting assemblies by the knife-like cutting edges 82d, and 83d. Continued downward movement of the cutting assemblies results in shearing of the nails and consequent separation of the slats from the ribs.

From the foregoing, it can be seen that the pallet disassembling machine of the present invention is one well adapted to quickly and easily separate the slats of the pallet from its internal ribs with minimal damage to the individual components.

It will be understood certain features and some combinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. An apparatus for disassembling wooden pallets that have a plurality of generally parallel, spaced apart ribs positioned between a plurality of outer slats that are fastened to the lateral edges of said ribs by means of nail-like fastening members, said apparatus comprising:
   a working table for retaining a pallet thereon;
   at least one cutting assembly having a member for forceably separating a slat from one of the lateral edges of one of the ribs to which the slat is fastened thereby to create between the slat and said edge a gap wherein a portion of each fastening member used to secure the slat to said edge is exposed, said member comprising a rigid plate having a beveled outer portion terminating in a sharp knife-like edge for engaging and shearing each fastening member used to fasten the slat to said edge thereby to detach the slat from said one edge; and
   drive means for moving said cutting assembly in a direction along said rib to bring said cutting assembly into engagement with each slat fastened to said one edge.

2. The apparatus in claim 1 wherein said knife-like edge includes a notched opening for receiving the exposed portion of a fastening member, said cutting assembly also including;
   a circular cutting blade positioned adjacent to said plate such that a portion of said cutting blade intersects at least a portion of the opening in the outer edge of said plate, and
   means for imparting rotary movement to said cutting blade about its center axis.

3. The apparatus as in claim 1, including means for conveying the detached slats away from the working table of said apparatus.

4. The apparatus as in claim 1, including:
   a loading table;
   a loading platform hingedly coupled with said loading table, said loading platform being normally maintained in a generally horizontal position for receiving a pallet to be disassembled;
   means for moving said loading platform about its hinge coupling to bring said loading platform to a generally vertical position to thereby place a pallet received by said loading platform onto said loading table; and
   means for conveying a pallet from said loading table to said working table.

5. An apparatus for disassembling wooden pallets that have a plurality of generally parallel spaced apart ribs positioned between a plurality of outer slats that are fastened to the lateral edges of said ribs by means of nail-like fastening members, said apparatus comprising:
   a working table for retaining a pallet thereon;
   a carrier head spaced from said working table and supported for movement toward same;
   prying means on said carrier head for engaging in succession each of the slats fastened to one of the lateral edges of one of the ribs to partly separate each of the slats one by one from said one edge;
   cutting means carried on said carrier head for movement in unison with said prying means toward the slats, said cutting means moving with said prying means into the space presented between said one rib and the partly separated slats and being operable to cut the fastening members upon engagement therewith; and
   drive means for moving said carrier head toward a pallet on the working table to move said prying means and said cutting means in unison along said one edge to bring said prying means in engagement with each of the slats fastened to said one edge and to bring said cutting means in engagement with each of the fastening members used to fasten each of the slats to said one edge.

6. The apparatus as in claim 5 wherein said prying means is comprised of a rigid plate having a beveled outer portion terminating in a sharp outer edge, said plate also having an opening defined in the outer edge thereof for receiving in succession at least a portion of the shaft of each fastening member used to secure each of the slats to said one edge.

7. The apparatus as in claim 6 wherein said cutting means is comprised of a circular cutting blade positioned adjacent to said plate such that at least a portion of said cutting blade intersects at least a portion of said opening in the outer edge of said covering plate and means for imparting rotatable movement to said cutting blade about its center axis.

8. The apparatus as in claim 5 including means for conveying the detached slats away from the working table of said apparatus.

9. The apparatus as in claim 5 including:
   a loading table;
   a loading platform hingedly coupled with said loading table, said loading platform being normally maintained in a generally horizontal position for receiving a pallet to be disassembled;
   means for moving said loading platform about its hinge coupling to bring said loading platform to a generally vertical position to thereby place a pallet received by said loading platform onto said loading table; and
   means for conveying a pallet from said loading table to said working table.

10. An apparatus for disassembling wooden pallets that have a plurality of generally spaced apart ribs positioned between a plurality of outer slats that are fastened to the lateral edges of said ribs by means of nail-like fastening members, said apparatus comprising:
   a working table for retaining a pallet thereon;
   at least one cutting assembly having a pair of spaced apart covering plates, each of said covering plates corresponding to one of the opposing edges of one of said ribs, each of said covering plates having a beveled outer portion terminating in a sharp outer edge which is arranged to successively engage each of the slats fastened to its corresponding edge of said one rib to partly separate each of the slats one by one from its corresponding edge thereby to create between a separated slat and its corresponding edge of said one rib a gap wherein a portion of each fastening member used to secure the separated slat to its corresponding edge is exposed, each of said covering plates also having an opening defined in its outer edge to receive in succession the exposed portion of each fastening pin used to secure each of the slats to its corresponding edge of said one rib;

said cutting assembly also having a pair of circular cutting saws, each of said cutting saws being positioned adjacent to one of said covering plates so that a portion of said cutting saw intersects at least a portion of said opening in the outer edge of its corresponding covering plate to thereby contact and sever the exposed portion of a fastening pin positioned within the opening;

means for imparting rotatable movement to each cutting blade about its center axis; and drive means for moving said cutting assembly along the opposing edges of said one rib to bring said cutting assembly into contact with each slat fastened to said edges.

11. The apparatus as in claim 10 including means for coupling said covering plates to each other and to said drive means such that said covering plates are capable of moving relative to each other to thereby vary the spacing between them.

12. The apparatus as in claim 11 including means for coupling each of said cutting blades to its corresponding covering plate such that said cutting blade is capable of moving in combination with its corresponding covering plate to thereby maintain a set spacing between them.

13. The apparatus as in claim 11 including a pair of positioning fingers, each of said positioning fingers being secure to one of said covering plates to extend outward from the outer eadge thereof, said positioning fingers being operable to successively contact the innter surface of each slat fastened to said one rib to vary the spacing between said covering plates to locate the outer edge of each plate at the junction between the slat fastened to the corresponding edge of said one rib and the corresponding edge of said one rib.

14. The apparatus as in claim 10, including means for conveying the detached slats away from the working table of said apparatus.

15. The apparatus as in claim 10, including:
a loading table;
a loading platform hingedly coupled with said loading table, said loading platform being normally maintained in a generally horizontal position for receiving a pallet to be disassembled;
means for moving said loading platform about its hinge coupling to bring said loading platform to a generally vertical position to thereby place a pallet received by said loading platform onto said loading table; and
means for conveying a pallet from said loading table to said working table.

16. An apparatus for disassembling wooden pallets, which pallets have a plurality of parallel spaced apart ribs with opposite edges to which slats are fastened by nail-like fastening members, said apparatus comprising:
a working table for receiving a pallet thereon with the pallet upright and the ribs generally vertical;
a plurality of cutting assemblies positioned above the table, one for each rib, each said cutting assembly including a pry means having a sharp leading edge and a powered rotary cutting blade having a cutting edge positioned above said pry means for cutting the fastening members,
carrier means for said cutting assembly and operable to advance said pry means and cutting blade downwardly in unison toward said pallet with the pry means engaging between a slat and rib to open a gap between the slats and rib and for continuing the advance of the cutting blade into cutting engagement with the fastening members whereby to cut the fastening members to disconnect the slats from the rib.

17. The apparatus as in claim 16 including means for conveying the detached slats away from the working table of said apparatus.

18. The apparatus as in claim 16 including:
a loading table;
a loading platform hingedly coupled with said loading table, said loading platform being normally maintained in a generally horizontal position for receiving a pallet to be disassembled;
means for moving said loading platform about its hinge coupling to bring said loading platform to a generally vertical position to thereby place a pallet received by said loading platform onto said loading table; and
means for conveying a pallet from said loading table to said working table.

19. An apparatus for disassembling wooden pallets that have a plurality of generally parallel, spaced apart ribs positioned between a plurality of outer slats that are fastened to the lateral edges of said ribs by means of nail-like fastening members, said apparatus comprising:
a working table for retaining a pallet thereon;
at least one cutting assembly having a member for forceably separating a slat from one of the lateral edges of one of the ribs to which the slat is fastened thereby to create between the slat and said edge a gap wherein a portion of each fastening member used to secure the slat to said edge is exposed, said cutting assembly also including cutting means for severing each fastening member used to fasten the slat to said edge thereby to detach the slat from said one edge;
drive means for moving said cutting assembly in a direction along said rib to bring said cutting assembly into engagement with each slat fastened to said one edge; and
means for conveying the detached slats away from the working table.

20. An apparatus for disassembling wooden pallets that have a plurality of generally parallel, spaced apart ribs positioned between a plurality of outer slats that are fastened to the lateral edges of said ribs by means of nail-like fastening members, said apparatus comprising:
a loading table;
a loading platform hingedly coupled with said loading table, said loading platform being normally maintained in a generally horizontal position for receiving a pallet to be disassembled;

means for moving said loading platform about its hinge coupling to bring said loading platform to a generally vertical position to thereby place a pallet received by said loading platform onto said loading table;

a working table spaced from said loading table and adapted to receive the pallet;

means for conveying the pallet from said loading table to said working table;

at least one cutting assembly supported above the working table and including a cutting member arranged to be driven between a slat and a rib in a manner to cut the fastening members, thereby separating the slat from the rib; and drive means for moving said cutting member between the slat and rib for cutting of the fastening members.

21. An apparatus for disassembling wooden pallets that have a plurality of spaced apart ribs positioned between opposed pairs of slats that are fastened to the ribs by nail-like fastening members, said apparatus comprising:

a working table for retaining a pallet thereon;

at least one cutting assembly having a pair of cutting members spaced apart from one another and mounted on the cutting assembly for movement toward and away from one another to permit adjustment of the distance between the cutting members to conform with the width dimension of each rib between the opposed pairs of slats, each cutting member having a sharp edge for cutting the fastening members upon engagement therewith; and drive means for moving said cutting assembly in a direction along the ribs to simultaneously bring said cutting members against the fastening members which fasten the opposed pairs of slats to each rib.

* * * * *